(12) United States Patent
Matus et al.

(10) Patent No.: US 7,109,433 B2
(45) Date of Patent: Sep. 19, 2006

(54) METHOD AND APPARATUS FOR INITIATING WELDING ARC USING CHEMICAL SPRAY

(75) Inventors: Tim A. Matus, San Antonio, TX (US); Lin Zhang, Appleton, WI (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 10/446,578

(22) Filed: May 27, 2003

(65) Prior Publication Data

US 2004/0238512 A1  Dec. 2, 2004

(51) Int. Cl.
B23K 35/38 (2006.01)

(52) U.S. Cl. ..................... 219/74; 219/130.4

(58) Field of Classification Search ............. 219/74, 219/75, 130.4, 69.12, 69.17; 315/111.01, 315/111.11
See application file for complete search history.

(56) References Cited

U.S. PATENT DOCUMENTS

| | | | |
|---|---|---|---|
| 1,261,178 A * | 4/1918 | Strong | 315/111.01 |
| 1,963,729 A * | 6/1934 | Adalbert | 219/74 |
| 2,472,923 A * | 6/1949 | Schmerber | 219/137 R |
| 2,473,600 A | 6/1949 | Loboaco | 219/10 |
| 3,805,016 A * | 4/1974 | Soejima et al. | 219/146.52 |
| 4,791,268 A | 12/1988 | Sanders et al. | 219/121.57 |
| 4,839,492 A * | 6/1989 | Bouchier et al. | 219/121.48 |
| 5,317,126 A | 5/1994 | Couch, Jr. et al. | 219/121.51 |
| 5,893,985 A | 4/1999 | Luo et al. | 219/121.48 |
| 6,034,350 A | 3/2000 | Heraly et al. | 219/130.4 |
| 6,075,224 A | 6/2000 | De Coster | 219/130.4 |

* cited by examiner

*Primary Examiner*—Len Tran
(74) *Attorney, Agent, or Firm*—Ostrager Chong Flaherty & Broitman P.C.

(57) ABSTRACT

Methods and apparatus for initiating an arc (e.g., a welding arc) by placing liquid droplets containing ions in the gap between an electrode and a workpiece. This is done while a potential difference is applied between the electrode and the workpiece. The presence of the ions renders the gap between the electrode and the workpiece more conductive, thereby reducing the voltage threshold needed to initiate an arc between the electrode and the workpiece. When the voltage threshold reaches the level of the applied potential difference, the arc will be initiated.

8 Claims, 2 Drawing Sheets

METHOD AND APPARATUS FOR INITIATING WELDING ARC USING CHEMICAL SPRAY

BACKGROUND OF THE INVENTION

This invention generally relates to methods and apparatus for starting a welding arc. In particular, the invention relates to methods and apparatus for starting a TIG welding arc.

Many methods of welding are known in the art, each with its own advantages and disadvantages. Common welding processes include gas welding, oxyacetylene brazing and soldering, shielded metal arc welding (SMAW) or "STICK" welding, gas metal arc welding (GMAW) or "wire feed" welding, gas tungsten arc welding (GTAW) or "TIG" welding, and plasma cutting. TIG welding is perhaps the cleanest, most precise of all hand-held welding operations. Although the method and apparatus of the present invention is preferably directed to a TIG welding operation, one skilled in the art will appreciate that the present invention may have applications for many other welding processes.

Figure 1:
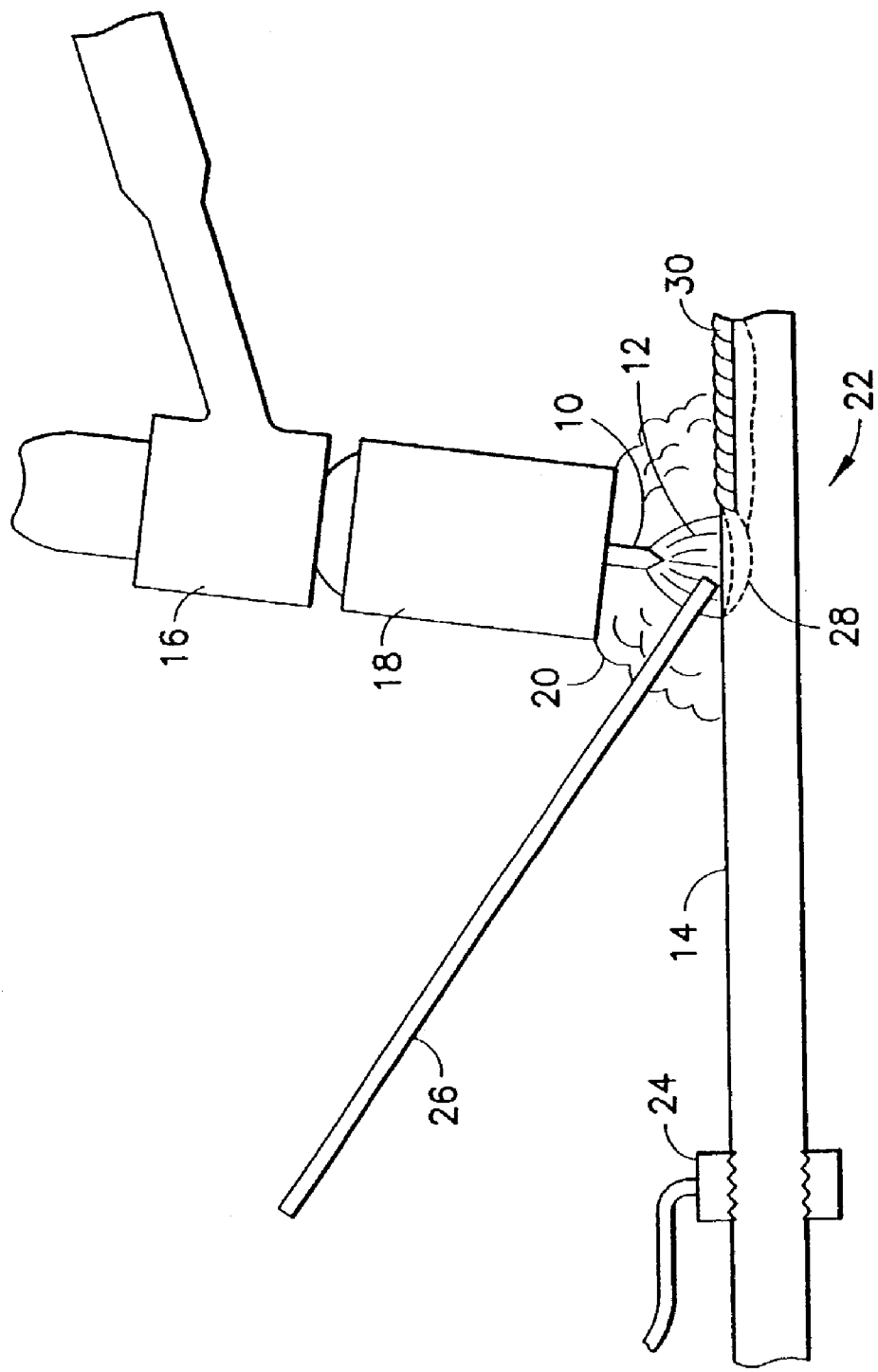

A conventional TIG welding process will now be described with reference to FIG. 1. In TIG welding, a concentrated high-temperature arc is drawn between a non-consumable tungsten electrode 10 and a workpiece 14, workpiece 14 being connected to the output of a welding power source (not shown) via a work clamp 24. Electrode 10 is nested in a torch 16, the torch including a shielding gas source 18, such as a cup, to direct a shielding gas 20, such as argon, helium, a mixture thereof, or other inert or non-inert gases, to a welding site 22 on workpiece 14. Torch 16 receives a flow of shielding gas 20 from a gas tank (not shown). In accordance with a known technique, the welder may strike an arc by touching or scraping the electrode 10 against the workpiece 14 to close a circuit between the electrode 10 and the work clamp 24. As electrode 10 is drawn away from the workpiece 14, an arc 12 is initiated. The welder then feeds a bare welding rod 26 to welding site 22. More precisely, the tip of the welding rod 26 is dipped into the weld puddle. The arc that crosses the gap from the electrode tip to the workpiece causes underlying workpiece material at the welding site to melt, thereby creating a molten puddle 28. During a single welding pass, the arc 12 and the welding rod 26 must be moved in unison in order to effect a weld bead. The displaced arc leaves the molten puddle 28 in its wake. The portion of the molten puddle furthest from the arc hardens continuously to leave a weld bead 30 joining two pieces of metal.

Numerous problems persist with the aforementioned physical method of striking an arc because the tip of the tungsten can contaminate the weld due to touching or scraping the electrode against the workpiece. Often, due to arcing a piece of the tip remains in the molten puddle and contaminates the weld. Also, the welder must then resharpen or replace the electrode. Not only does this process inconvenience the welder, but it also wastes time and resources, which ultimately imparts a higher cost to each weld.

One known solution to the above problems has been to use a high-frequency signal to initiate and maintain the arc. A high-frequency signal ionizes the shielding gas, allowing the welding power to jump the gap between electrode and workpiece. However, high frequency, too, has its drawbacks. The high-voltage, low-amperage noise from the high-frequency circuitry often causes electrical interference with surrounding equipment, making its use unacceptable in certain applications. Also, the high-frequency signal can be tough on TIG torches and work leads because the high voltage causes a stress to be applied to the insulation of the weld cables.

Another arc starting method that avoids the problems associated with the scratch start is the "lift" arc method. Lift arc starting involves touching the electrode to the workpiece without the necessary scraping to generate a spark. Some known lift arc methods utilize a separate low-current power circuit, in addition to the power circuits already present in a welding device, to create a small monitoring voltage between the electrode and work clamp. Control circuitry monitors the voltage between the electrode and work clamp and, when a short is detected (i.e., the electrode has been touched to or brought in close proximity with the workpiece), enables the power circuit to provide an initial regulated current to warm, but not melt the electrode. When the control circuitry detects a significant torch-to-workpiece voltage (i.e., the electrode is no longer touching or is not in close proximity to the workpiece), the control circuitry enables the power circuit to provide full user-selected welding power. However, the separate power circuit required to provide the small monitoring voltage leads to additional cost and complexity of the circuitry in the welding power source. Furthermore, some lift arc start methods fail to reliably regulate the output current level before and after the short is detected. An improved "lift" arc technique, directed to overcoming the foregoing disadvantages, is disclosed in U.S. Pat. No. 6,034,350. Still some welding procedures require that the tungsten not touch the workpiece.

Another known solution, disclosed in U.S. Pat. No. 6,075,224, is to start a welding arc by applying an arc starting signal to ionize the shielding gas before enabling welding output power. The welding device disclosed in U.S. Pat. No. 6,075,224 comprises a power circuit to provide welding power, a shielding gas source to provide a shielding gas at a welding site disposed between an electrode and a workpiece, an arc starter circuit (e.g., a high-frequency start circuit) to apply an arc starting signal to ionize the gas, and a controller coupled to a control input of the power circuit. The arc starting steps are also controlled by the controller. First, the controller enables a flow control meter to begin supplying shielding gas to the welding site. When the pre-flow period has expired, the controller enables the arc starter circuit, which generates an arc starting signal that is provided to the power output for a predetermined period of time during which the resulting arc ionizes the flow of shielding gas particles. The starting arc is not suitable for welding. A predetermined time after the arc starting signal is applied, the controller enables the power circuit such that welding power is provided and an arc suitable for welding is drawn between the electrode and the workpiece.

There is an ongoing need for further improvements in methods and apparatus for initiating and maintaining a TIG or other welding arc.

BRIEF DESCRIPTION OF THE INVENTION

The invention is directed to methods and apparatus for initiating an arc (e.g., a welding arc) by placing liquid droplets containing ions in the gap between an electrode and a workpiece. This is done while a potential difference is applied between the electrode and the workpiece. The presence of the ions renders the gap between the electrode and the workpiece more conductive, thereby reducing the voltage threshold needed to initiate an arc between the electrode and the workpiece. When the voltage threshold reaches the level of the applied potential difference, the arc will be initiated. The size of the droplets is preferably very fine, like a mist. The concentration of the solution should be sufficiently high to increase the conductivity in the gap between the electrode and the workpiece effectively.

One aspect of the invention is a method of initiating an arc between an electrode and a workpiece, comprising the following steps: positioning the electrode and the workpiece so that there is a gap between a tip of the electrode and the workpiece; applying a potential difference between the electrode and the workpiece; and spraying liquid droplets of a solution of an ionic compound into the gap between the electrode tip and the workpiece.

Another aspect of the invention is a method of initiating an arc between an electrode and a workpiece, comprising the following steps: positioning the electrode and the workpiece so that there is a gap between a tip of the electrode and the workpiece; applying a potential difference between the electrode and the workpiece; and placing a mist containing ions into the gap between the electrode tip and the workpiece.

A further aspect of the invention is an apparatus comprising: an electrode comprising a tip; a shield surrounding the electrode to form a passageway therebetween; and an atomizer that emits liquid droplets of a solution of an ionic compound through an outlet.

Yet another aspect of the invention is a system comprising: an electrode comprising a tip; a workpiece separated from the tip of the electrode by a gap; a power circuit for applying a predetermined potential difference between the electrode and the workpiece; and an atomizer that emits liquid droplets containing ions through an outlet, the atomizer being arranged such that at least some of the emitted liquid droplets enter the gap between the electrode tip and the workpiece.

A further aspect of the invention is a method for initiating an arc between an electrode and a workpiece separated by a gap, comprising the following steps: applying a potential difference between the electrode and the workpiece; and placing a dispersed solution of an ionic compound in the gap between the electrode tip and the workpiece.

Other aspects of the invention are disclosed and claimed below.

BRIEF DESCRIPTION OF THE DRAWINGS

FIG. 1 is a drawing illustrating a conventional TIG welding operation, described in the Background of the Invention section.

FIG. 2 is a drawing showing a partial sectional view of an apparatus comprising an atomizer and a TIG welding torch in accordance with one embodiment of the present invention.

Reference will now be made to the drawings in which similar elements in different drawings bear the same reference numerals.

DETAILED DESCRIPTION OF THE INVENTION

In accordance with the basic concept of the invention, arc initiation is aided by the presence of a dispersed solution of an ionic compound in the gap between an electrode and a workpiece that have a difference in their electric potentials. In accordance with one method, a spray of liquid droplets of the solution is directed into the gap, e.g., using a spray nozzle. The spray nozzle may be a separate device held and manipulated by the system operator or it may be an attachment to the torch of which the electrode is part. In accordance with another method, a mist of fine liquid droplets of the solution may be generated in sufficient proximity to the gap that the mist spreads into the gap.

The basic concept of an apparatus that employs spraying is illustrated in FIG. 2, which shows a setup for TIG welding arc initiation. The workpiece 14 is positioned with the welding site disposed directly underneath the tip of a tungsten electrode 10 of a TIG welding torch 2. The electrode 10 receives electrical power from a power supply 48 via a power circuit 50. When the power circuit 40 is turned on, the power supply 48 produces a difference in the electric potentials at the electrode 10 and the workpiece 14 respectively. During welding arc formation, the electrode 10 receives current via the power circuit 50. A workpiece lead 52 provides a return path for the current and is typically connected to the workpiece 14 by a clamp (not shown). In the absence of an arc, current does not flow through the electrode and the workpiece.

The TIG welding torch 2 further comprises a generally circular cylindrical gas cup or shield 18 that surrounds and is generally coaxial with the electrode 10. The cup 18 defines the outer boundary of a generally annular passageway through which a shielding gas, such as argon, helium, a mixture thereof, or other inert or non-inert gas, flows. The shielding gas flow is indicated by arrows 20 in FIG. 2. The shielding gas is conveyed to the welding torch from a gas supply tank by means not shown, which means typically include a cable that connects the welding torch to the power supply unit. Typically the cable carries both shielding gas and electric power to the welding torch.

To initiate an arc in accordance with one embodiment of the invention, the flow of shielding gas is turned on, and a potential difference is applied between the electrode 10 and the workpiece 14. Initially, the conditions are such that an arc is not initiated, i.e., the resistance across the gap separating the tip of electrode 10 and the workpiece 14 is too great relative to the potential difference or voltage being applied. The present invention employs means for increasing the conductivity of the gap to a point whereat the arc will be initiated at the applied voltage.

FIG. 2 depicts an instant in time immediately following initiation of a welding arc 12 between the electrode 10 and the workpiece 14. In accordance with the embodiment depicted in FIG. 2, the welding arc is initiated with the aid of a spray nozzle 32, which directs a spray 44, made up of liquid droplets of a solution of an ionic compound, toward the gap between the electrode 10 and the workpiece 14. Although many different types of spray nozzles may be utilized, for the sake of illustration, FIG. 2 depicts an air-assisted atomizing spray nozzle 32 that produces a fan-shaped spray 34. The structure and operation of such spray nozzles is well known. For example, U.S. Pat. No. 6,036,116 discloses such a spray nozzle.

In the particular example depicted in FIG. 2, the spray nozzle 32 comprises a nozzle tip assembly 34, a nozzle body assembly 36 and an extension tube 38 that provides fluid communication between the nozzle tip assembly 34, a nozzle body assembly 36. The nozzle body assembly 36 includes a nozzle body 37 and a fluid inlet fitting 39 that is coupled to the nozzle body 37 and to a tube or pipe 40 that carries the aforementioned ionic compound solution under pressure. An air inlet member is disposed inside an elongated passage in the inlet end of the nozzle body 37 (not visible in FIG. 2) 41 of the nozzle body 37. The air inlet member is coupled to an air intake line 42, which provides pressurized air. The pressured liquid and the pressured air are mixed in a mixing chamber inside the nozzle body 37, causing the liquid to atomize. The atomized liquid travels axially through the extension tube 38 and becomes a uniform stream as it enters a chamber in the nozzle tip. The uniform stream is divided into two uniform-flow liquid jets as it passes around a deflection pin (not shown in FIG. 2). A hemispherical bottom surface inside the nozzle tip redirects the flow of each jet toward each other, causing them to impinge against one another and, thereafter, exit the nozzle tip through a discharge orifice. Impingement of the jet streams against one another further atomizes the liquid spray. The discharge orifice has a beveled periphery that helps to form a fan-shaped spray 44 as it exits the nozzle. The shape of the discharged liquid spray is substantially determined by the shape of the discharge orifice.

The liquid spray 44 is directed toward the gap between the electrode 10 and the workpiece 14. The spray nozzle 32 may be held and aimed by the welder or may be supported in a fixed positional relationship with the TIG torch, e.g., by means of a support member 46, the ends of which are welded or clamped to the gas cup 18 and to the spray nozzle 32 respectively.

In accordance with one embodiment of the invention, the solution comprises water as the solvent and an ionic compound as the solute. When the ionic compound is dissolved in water, the solution contains a mixture of positive and negative ions and water molecules. When these ions are present in the gap between the electrode and the workpiece in sufficient quantity while a predetermined threshold voltage is being applied across the electrode and workpiece, an arc is initiated between the electrode and the workpiece. This is facilitated by the increase in electrical conductivity in the gap due to the presence of positive and negative ions. Three examples of suitable ionic compounds are sodium carbonate, potassium dichromate and sodium chloride. However, the invention is not limited to use of these specific chemicals.

The person skilled in the art will appreciate that in order to initiate an arc, other factors being constant, the conductivity of the gap must increase as the potential difference across the gap is decreased. The applied open-circuit voltage may be on the order of 70 or 80 volts, but any other voltage sufficient for TIG welding can be applied during arc initiation.

Figure 2:
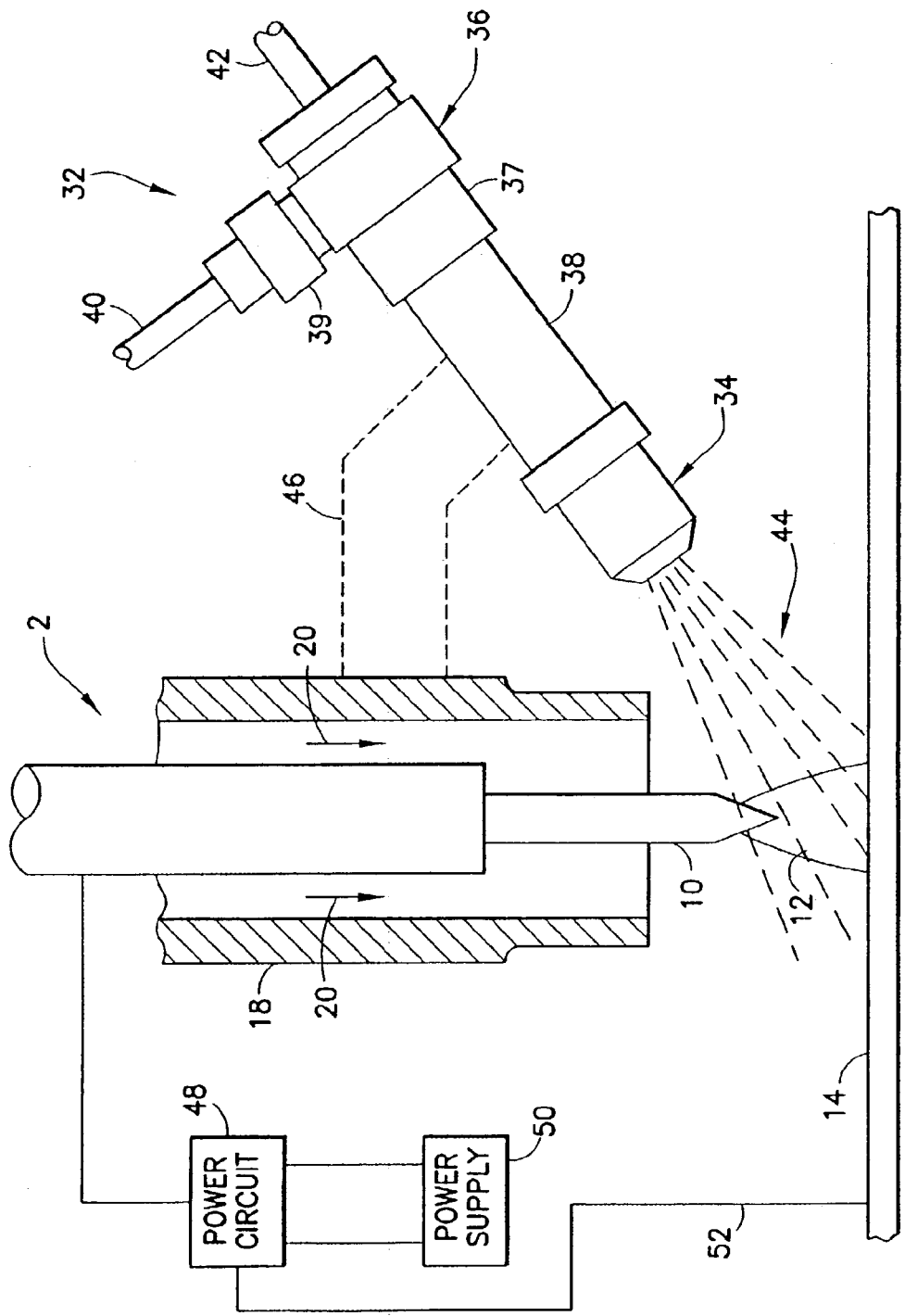

In accordance with the embodiment shown in FIG. 2, a welding arc is initiated between the tungsten electrode 10 and the workpiece 14 by holding the TIG torch 2 in a position wherein the tip of the tungsten electrode 10 is separated from and not in contact with the workpiece 14; turning on the shielding gas flow 20; applying a predetermined potential difference between the electrode 10 and the workpiece 14; and then spraying liquid droplets of a solution of an ionic compound into the gap separating the electrode and the workpiece. The ions in the solution increase the electrical conductivity in the space separating the TIG electrode 10 and the workpiece 14. This, in turn, has the effect of reducing the voltage threshold at which an arc between the electrode tip and the workpiece will be produced. For example, the potential difference initially applied between the tungsten electrode 10 and the workpiece 14 is less than the voltage threshold required to initiate an arc when the ionized droplets are not present, but greater than or equal to the voltage threshold required to initiate an arc when the ionized droplets are present. Thus, by directing a chemical spray into the gap between the electrode 10 and the workpiece 14, a welding arc 12 can be initiated.

The size of the droplets is preferably very fine, like a mist. The concentration of the solution should be sufficiently high to increase the conductivity in the gap between the electrode and the workpiece effectively.

It should be appreciated that the method of the invention can be practiced manually without the use of dedicated equipment. For example, a commercially available plastic bottle having a push-down spray nozzle can be filled with the described solution. The system operator can then hold the welding torch in one hand while manipulating the bottle of solution with the other hand, using an index finger to spray solution into the gap between the electrode and the workpiece.

While the invention has been described with reference to preferred embodiments, it will be understood by those skilled in the art that various changes may be made and equivalents may be substituted for members thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

The invention claimed is:

1. A method of initiating an arc between an electrode and a workpiece, comprising the following steps performed prior to arc initiation:

positioning the electrode and the workpiece so that there is a gap between a tip of the electrode and the workpiece;

applying a potential difference between the electrode and the workpiece; and placing a mist containing ions into said gap while said potential difference is being applied, said gap, said potential difference and the amount of ions in said gap creating a state in which an arc is initiated between the electrode and the workpiece, said gap and said potential difference being such that an arc would not have been initiated in the absence of said ion-containing mist in said gap.

2. The method as recited in claim 1, wherein said ions comprise sodium ions.

3. The method as recited in claim 1, wherein said ions comprise potassium ions.

4. The method as recited in claim 1, further comprising the following steps:

dissolving an ionic compound in water to form a solution; and atomizing said solution to form said mist.

5. The method as recited in claim 1, wherein said mist comprises fine liquid droplets of a solution of an ionic compound.

6. The method as recited in claim 5, wherein said ionic compound is sodium chloride.

7. The method as recited in claim 5, wherein said ionic compound is sodium carbonate.

8. The method as recited in claim 5, wherein said ionic compound is potassium dichromate.

* * * * *